United States Patent [19]

Dewprashad et al.

[11] Patent Number: 5,559,086
[45] Date of Patent: Sep. 24, 1996

[54] EPOXY RESIN COMPOSITION AND WELL TREATMENT METHOD

[75] Inventors: Brahmadeo Dewprashad, Newcastle; Jimmie D. Weaver, Duncan, both of Okla.

[73] Assignee: Halliburton Company, Duncan, Okla.

[21] Appl. No.: 166,561

[22] Filed: Dec. 13, 1993

[51] Int. Cl.$^6$ .............................. C09K 7/02; C09K 7/00; C09K 3/20; C08G 59/50
[52] U.S. Cl. .................. 507/219; 507/926; 507/922; 523/130; 523/131; 523/401; 523/414; 523/420; 528/122; 528/123
[58] Field of Search .................. 523/130, 131, 523/401, 414, 420; 528/122, 123, 124; 507/926, 903, 219, 922

[56] References Cited

U.S. PATENT DOCUMENTS

| | | | |
|---|---|---|---|
| 3,854,533 | 12/1974 | Gurley et al. | 166/276 |
| 4,168,257 | 9/1979 | Meijs | 507/926 |
| 4,199,484 | 4/1980 | Murphey | 260/13 |
| 4,291,766 | 9/1981 | Davies et al. | 166/276 |
| 4,336,842 | 6/1982 | Graham et al. | 166/276 |
| 4,428,426 | 1/1984 | Davies et al. | 166/295 |
| 4,665,988 | 5/1987 | Murphey et al. | 166/295 |
| 4,972,906 | 11/1990 | McDaniel | 166/276 |
| 5,128,390 | 7/1992 | Murphey et al. | 523/130 |
| 5,131,472 | 7/1992 | Dees et al. | 166/308 |
| 5,280,091 | 1/1994 | Dubowik et al. | 525/504 |
| 5,310,770 | 5/1994 | DeGooyer et al. | 523/414 |

OTHER PUBLICATIONS

Sales brochure entitled "Air Products–Pacific Anchor Epoxy Curing Agents and Diluents–ANCAMINE® 2264 Curing Agent," available from Air Products and Chemicals, Inc., Pacific Anchor Chemical, 7201 Hamilton Blvd., Allentown, Pa 18195, publication date Jun. 1993.

*Primary Examiner*—Sharon A. Gibson
*Assistant Examiner*—Joseph D. Anthony
*Attorney, Agent, or Firm*—Robert A. Kent; Craig W. Roddy; Dennis D. Brown

[57] ABSTRACT

In one embodiment, an epoxy resin composition is provided comprising: an epoxy resin and a partially reduced aromatic amine hardening agent. In another embodiment, a well treating composition is provided comprising: an epoxy resin; a partially reduced aromatic amine hardening agent; a solid particulate material; and a carrier fluid. In yet another embodiment, a method of treating a subterranean formation is provided. The inventive method comprises the step of placing the inventive well treating composition into the formation.

10 Claims, No Drawings

5,559,086

EPOXY RESIN COMPOSITION AND WELL TREATMENT METHOD

FIELD OF THE INVENTION

The present invention relates to epoxy resin compositions. The present invention also relates to methods of treating subterranean formations using consolidatable epoxy resin-coated particulate materials.

BACKGROUND OF THE INVENTION

Consolidatable epoxy resin-coated particulate materials have been used heretofore in various well treatment operations. Consolidatable epoxy resin-coated sands have been used, for example, for gravel packing, for the development of controlled permeability synthetic formations within subterranean zones, for frac-pack operations, and as proppant materials in formation fracturing operations. Due to their desirable permeability and compressive strength characteristics, consolidatable epoxy resin-coated particulate materials are especially well-suited for treating semiconsolidated and unconsolidated formations which contain loose or unstable sands.

As used herein, the term "consolidatable epoxy resin-coated particulate material" refers to a particulate material which is coated with an uncured or only partially cured epoxy resin composition. Typically, the consolidatable epoxy resin-coated particulate material will be injected into a subterranean zone using procedures whereby the epoxy resin does not substantially harden until after the particulate material has been delivered to a desired location within the formation. The consolidatable epoxy resin-coated particulate material will typically harden within the formation to form a hard, consolidated, permeable mass.

Those skilled in the art have commonly used gravel packs to control particulate migration in producing formations. A gravel pack will typically consist of a mass of particulate material which is packed around the exterior of a screening device, said screening device being positioned in an open hole or inside a well casing. Examples of typical screening devices include wire-wrapped screens and slotted liners. The screening device will typically have very narrow slots or very small holes formed therein. These holes or slots are large enough to permit the flow of formation fluid into the screening device but are too small to allow the particulate packing material to pass therethrough. In conjunction with the operation of the holes or slots formed in the screening device, the particulate packing material operates to trap, and thus prevent the further migration of, formation sand and fines which would otherwise be produced along with the formation fluid.

Hydraulic fracturing techniques are commonly used to stimulate subterranean formations in order to enhance the production of fluids therefrom. In a conventional hydraulic fracturing procedure, a fracturing fluid is pumped down a well bore and into a fluid-bearing formation. The fracturing fluid is pumped into the formation under a pressure sufficient to enlarge natural fissures in the formation and/or open up new fissures in the formation. Packers can be positioned in the well bore as necessary to direct and confine the fracturing fluid to the portion of the well which is to be fractured. Typical fracturing pressures range from about 1,000 psi to about 15,000 psi depending upon the depth and the nature of the formation being fractured.

Fracturing fluids used in conventional hydraulic fracturing techniques include: fresh water; brine; liquid hydrocarbons (e.g., gasoline, kerosene, diesel, crude oil, and the like) which are viscous or have gelling agents incorporated therein; gelled water; and gelled brine. The fracturing fluid will also typically contain a particulate proppant material. The proppant flows into and remains in the fissures which are formed and/or enlarged during the fracturing operation. The proppant operates to prevent the fissures from closing and thus facilitates the flow of formation fluid through the fissures and into the well bore.

Frac-pack operations are primarily used in highly unconsolidated formations to facilitate fluid recovery while preventing particulate migration. A frac-pack operation typically embodies the features of both a fracturing operation and a gravel packing operation. Preferably, the unconsolidated formation is initially fractured using a proppant-laden fracturing fluid. The proppant material deposits in the fractures which are formed during the fracturing operation. Due to the highly unconsolidated nature of the formation, the fractures produced during the fracturing step will typically be substantially wider and shorter than the fractures produced when fracturing consolidated formations. After a desired degree of fracturing is achieved, additional proppant material is tightly packed in the well bore. The additional proppant material will typically be held in place in the well bore by (a) packing the proppant material around a gravel packing screen and/or (b) consolidating the proppant material by means of a resin coating.

Examples of particulate materials commonly used for gravel packing and frac-pack operations and as fracturing proppants include: sand; glass beads; nut shells; metallic pellets or spheres; gravel; synthetic resin pellets or spheres; gilsonite; coke; sintered alumina; mullire; like materials; and combinations thereof.

Well treatment methods utilizing consolidatable epoxy resin-coated particulate materials are disclosed, for example, in U.S. Pat. No. 5,128,390. The entire disclosure of U.S. Pat. No. 5,128,390 is incorporated herein by reference.

U.S. Pat. No. 5,128,390 discloses a method for continuously forming and transporting consolidatable resin-coated particulate materials. In the method of U.S. Pat. No. 5,128,390, a particulate material (e.g., sand) and a hardenable epoxy resin system are continuously mixed with a stream of gelled carrier liquid. The resulting continuous composition is delivered to and/or injected into a desired subterranean zone. As the continuous mixture flows down the well tubing toward the subterranean zone, the composition ingredients are mixed such that the gel-suspended particulate material is thoroughly coated with the hardenable epoxy resin system. After being placed in the subterranean zone, the epoxy resin composition is allowed to harden whereby the resin-coated particulate material forms a hard, permeable, consolidated mass.

The hardenable epoxy resin composition used in the method of U.S. Pat. No. 5,128,390 is generally composed of: a polyepoxide resin carried in a solvent system; a hardening agent; a coupling agent; and a hardening rate controller. The hardening agent used in the method of U.S. Pat. No. 5,128,390 is either (a) an amine, a polyamine, an amide and/or a polyamide dissolved in a suitable solvent or (b) a liquid eutectic mixture of amines diluted with methanol.

Epoxy resin system curing agents currently used in the art typically contain 4,4'-methylenedianiline (MDA). MDA is a multifunctional hardening agent which provides desirable cured resin properties. However, since MDA is a carcinogen, costly and tedious procedures must be used in order to monitor worker exposure and to protect workers from overexposure. Thus, a need presently exists for an epoxy resin system hardening agent which provides cured resin properties at least comparable to those provided by MDA but which is also nonhazardous.

As will also be understood by those skilled in the art, a need presently exists for epoxy resin system hardening agents which provide faster curing times without sacrificing resin performance. In some fracturing operations, for example, the proppant material is subjected to substantial formation stresses. These stresses can operate to crush a substantial amount of the proppant material and thereby reduce the conductivity of the proppant bed. The presence of a cured resin coating on the proppant material strengthens the proppant material and protects it from formation stresses. Consequently, the achievement of a more rapid curing rate would accelerate the process by which the protective coating is formed on the proppant material and thereby reduce the amount of proppant crushing which occurs.

As will be further appreciated by those skilled in the art, a need presently exists for a means of eliminating the necessity of using curing accelerators in wells having low bottom hole temperatures. Currently, the use of one or more accelerators in such wells is necessary in order to achieve satisfactory curing rates. However, curing accelerators typically produce an undesirable degree of plasticization in the cured resin system. Curing accelerators also typically operate to undesirably lower the glass transition temperatures of cured resin systems.

SUMMARY OF THE INVENTION

In one embodiment, the present invention provides an epoxy resin composition comprising: an epoxy resin and a partially reduced aromatic amine hardening agent. In another embodiment, the present invention provides a well treating composition comprising: an epoxy resin; a partially reduced aromatic amine hardening agent; a solid particulate material; and a carrier fluid. In yet another embodiment, the present invention provides a method of treating a subterranean formation. The inventive method comprises the step of placing the inventive well treating composition into the formation.

The partially reduced aromatic amine hardening agent used in the present invention surprisingly and unexpectedly (a) provides a low temperature curing rate which substantially exceeds the curing rates of corresponding nonreduced aromatic amine hardening agents and (b) provides substantially the same high temperature properties (e.g., compressive strength and glass transition temperature) provided by the nonreduced hardeners. Due to its greater low temperature curing ability, the inventive well treating composition substantially eliminates the need to use accelerating agents when treating wells having low bottom hole temperatures.

The results provided by the present invention are unexpected in view of the fact that complete aromatic ring reduction in the hardening agent typically has a substantial deleterious effect on the high temperature performance of the cured resin. Apparently, any reduction in high temperature performance which might be caused in the present invention by the use of a partially reduced hardening agent is compensated for by the occurrence of a greater degree of crosslinking. Greater crosslinking is believed to result from the fact that the partially reduced hardener ring system is more flexible than a corresponding nonreduced ring system. It is believed that the increased flexibility of the partially reduced hardener generally enables the hardener molecules to effectively reach and react with a greater number of epoxide groups.

In addition to the advantages mentioned above, the present invention also provides a more flexible cured resin system which will yield consolidations which are more durable under production conditions. Further, the partially reduced aromatic amine hardening composition used in the present invention is substantially nonhazardous and preferably does not contain any substantial amount of MDA.

Additional objects, features, and advantages of the present invention will be apparent to those skilled in the art upon reading the following description of the preferred embodiments.

DESCRIPTION OF THE PREFERRED EMBODIMENTS

The inventive epoxy resin system comprises one or more epoxy resins and one or more partially reduced aromatic amine hardening agents. The inventive epoxy resin system can optionally include one or more members selected from the group consisting of: a solvent or solvent system for the epoxy resin(s); a diluent or diluent system for the hardening agent; one or more coupling agents; one or more compounds which are operable for crosslinking the epoxy resin system; various surfactants; hardening rate controllers; methanol; and one or more aliphatic alcohols.

The inventive epoxy resin system can be used to form an inventive well treating composition. The inventive well treating composition comprises: the inventive epoxy resin system; a carrier fluid; and a particulate material.

Except for the hardening agents disclosed and used therein, epoxy resin systems, resin system components, resin system component concentrations, well treating compositions, well treating composition components, and well treating composition component concentrations suitable for use in the present invention are disclosed, for example, in U.S. Pat. Nos. 4,199,484, 4,665,988, and 5,128,390. The entire disclosure of each of these patents is incorporated herein by reference.

Epoxy resins preferred for use in the inventive epoxy resin system are those which (a) will coat a particulate material when the particulate material is suspended in a gelled carrier and (b) will harden when placed downhole such that the epoxy resin-coated particulate material is thereby consolidated to form a hard permeable mass. The epoxy resins used in the inventive epoxy resin system will also preferably be multifunctional polyepoxide resins having three or more reactive epoxide groups per resin molecule. Further, the epoxy resins used in the inventive epoxy resin system will preferably have epoxide equivalent weights in the range of from about 90 to about 300. The epoxide equivalent weight of an epoxy resin is determined by dividing the molecular weight of the epoxy resin by the number of epoxide groups contained in each molecule of the epoxy resin.

Examples of epoxy resins preferred for use in the present invention include: the diglycidyl ethers of bisphenol-A; the diglycidyl ethers of bisphenol-F; the glycidyl ethers of aminophenols; the glycidyl ethers of methylenedianiline; and epoxy novolac resins. The epoxy resin used in the present invention is most preferably a multifunctional epoxy novolac resin (e.g., EPI-REZ SU2.5 available from Rhone-Poulenc).

As indicated above, the epoxy resin system can also include a solvent or solvent system. When used, the solvent or solvent system will preferably be included in the epoxy resin system in an amount sufficient to ensure that the viscosity of the epoxy resin system does not substantially exceed about 5000 centipoise at 75° C. Most preferably, a solvent or solvent system will be included in an amount sufficient to yield an epoxy resin system viscosity in the range of from about 100 centipoise to about 800 centipoise.

Examples of solvents suitable for use in the epoxy resin system include: polar organic diluents which are reactive with epoxy resins; polar organic diluents which are substantially nonreactive with epoxy resins; and mixtures thereof. Examples of suitable reactive polar organic diluents include: butylglycidylethers; cresolglycidylethers; alkylglycidylethers; phenylglycidylethers; and generally any other glycidyl ether which is miscible with the epoxy resin(s) used. Reactive organic diluents preferred for use in the epoxy resin system are multifunctional diluents such as 2.6-diglycidylphenyl glycidyl ether, trimethylol propane glycidyl ether, and trimethylolethane triglycidyl ether. Examples of substantially nonreactive polar organic diluents suitable for use in the epoxy resin system are disclosed, for example, in U.S. Pat. No. 5,128,390. Preferred nonreactive polar organic diluents include: ethylacetate; butyl lactate; ethyl lactate; amyl acetate; ethylene glycol diacetate; and propylene glycol diacetate.

The hardening agent used in the inventive resin system is comprised of one or more partially reduced aromatic amines. The hardening agent is preferably comprised of one or more partially reduced multifunctional aromatic amines, especially partially reduced multifunctional aromatic amines having at least three reactive amine sites. The multifunctional nature of such hardening agents provides a greater degree of crosslinking in the hardened resin composition.

Partially reduced multifunctional aromatic amines particularly preferred for use in the present invention are those of the type including reduced outer rings connected to an aromatic (i.e., nonreduced) central portion. The reduction of the outer rings apparently increases the reactivity of the hardening agent. Examples of such compounds include

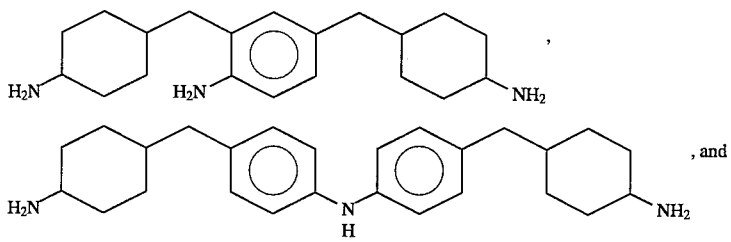

mixtures thereof.

The partially reduced aromatic amine hardening agents used in the present invention can be prepared, for example, by heating the corresponding nonreduced aromatic amine compounds together with hydrogen in the presence of a catalyst (e.g., a palladium on carbon catalyst). A composition containing partially reduced multifunctional aromatic amine structures of the type particularly preferred for use in the present invention is commercially available from Air Products and Chemicals, Inc. under the trade name ANCAMINE 2264.

When used in forming the inventive epoxy resin system, the partially reduced amine hardening agent will preferably be dissolved in a solvent. Examples of suitable solvents include methanolethylacetate, ethanolisopropyl alcohol, toluene, and the like. The solvent used in the present invention is preferably methanol.

The hardening agent used in the inventive resin system will preferably be present in the resin system in an effective amount for curing the resin system. The amount of hardening agent used will generally be an amount in the range of from about 2 to about 150 parts by weight per 100 parts by weight of polyepoxide resin. Typically, the hardening agent will be present in an amount in the range of from about 25 parts to about 50 parts (preferably from about 30 to about 35 parts) by weight per 100 parts by weight of epoxy resin.

The carrier fluid used in forming the inventive treating composition can generally be any type of carrier fluid which is used in fracturing, frac-pack, gravel packing, or other similar procedures. Examples include: fresh water; brine; liquid hydrocarbons (e.g., gasoline, kerosene, diesel, crude oil, and the like) which are viscous and/or have viscosifiers or gelling agents incorporated therein; gelled water; and gelled brine. The carrier fluid is preferably a gelled aqueous composition formed from water, brine, or a similar aqueous fluid. The aqueous fluid is preferably a brine solution produced by the addition of sodium chloride, potassium chloride, ammonium chloride, calcium chloride, or the like to fresh water. Most preferably, the aqueous fluid is a brine solution comprising water and an amount of potassium chloride or ammonium chloride in the range of from about 2% to about 3% by weight based on the total weight of the brine solution.

Gelled carrier fluid systems, additives, and concentrations suitable for use in the present invention are disclosed, for example, in U.S. Pat. Nos. 4,199,484, 4,665,988 and 5,128,390. The entire disclosures of these patents are incorporated herein by reference.

Generally any gelling agent commonly used in well treating operations to form gelled aqueous carrier liquids can be used in the present invention. The gelling agents preferred for use in the present invention are polysaccharides having molecular weights in the range of from about 100,000 to about 4,000,000. Polysaccharides having molecular weights in the range of from about 600,000 to about 2,400,000 are particularly well-suited for use in the present invention. The polysaccharide gelling agent will preferably include hydroxyethyl or other substituents which provide water hydration and other characteristics conducive to the formation of a clear aqueous gel having a viscosity of at least about 30 centipoise on a Fann V.G. meter at 300 rpm. Examples of polysaccharide polymers preferred for use in the inventive well treating composition include: substituted carboxy and hydroxy alkyl cellulose (e.g., hydroxyethyl cellulose and carboxymethyl hydroxyethyl cellulose); guar gum; and guar gum derivatives (e.g., hydroxy propyl guar).

The gelling agent used in the inventive composition is most preferably either hydroxypropyl guar or carboxyethyl hydroxypropyl guar and most preferably has a propylene oxide substitution of from about 0.1 to about 0.7 moles of propylene oxide per mole of mannose and galactose contained in the guar.

The amount of polysaccharide gelling agent used in forming the gelled aqueous carrier liquid will preferably be an amount in the range of from about 20 to about 120 pounds of gelling agent per 1000 gallons of fluid. The gelled aqueous carrier liquid will preferably have a viscosity in the range of from about 10 centipoise to about 400 centipoise at a shear rate of 511 $sec^{-1}$. Most preferably, the gelled aqueous carrier liquid is comprised of from about 30 to about 50 pounds of hydroxypropyl guar gelling agent per 1000 gallons of water and has a viscosity in the range of from 15 to about 100 centipoise.

The gelled aqueous carrier liquid can also include one or more gel crosslinking agents. Examples of suitable gel crosslinking agents include: titanium lactate; titanium triethanolamine; aluminum acetate; magnesium oxide; zirconium salts; borate salts; and various chromium-containing compounds.

The inventive well treating composition preferably also includes one or more gel breakers. Gel breaker systems and gel breaker concentrations suitable for use in the present invention are disclosed, for example, in U.S. Pat. Nos. 4,199,484, 4,665,988, and 5,128,390. The gel breakers preferred for use in the inventive composition are materials which are operable for breaking the aqueous carrier gel, and thereby reducing the viscosity of the aqueous carrier liquid, at a time substantially corresponding to the placement of the inventive composition in a desired subterranean zone. When the carrier liquid gel is broken, the carrier liquid readily separates from the remainder (i.e., the epoxy resin-coated particulate portion) of the well treating composition. The epoxy resin-coated particulate material then consolidates to form a hard permeable mass in the subterranean zone.

Examples of gel breakers suitable for use in the present invention include: enzyme-type gel breakers such as cellulase and hemicellulase; low molecular weight peroxides and hydroperoxide compounds (e.g., tert-butyl-hydroperoxide and alkyl peroxides containing from 2 to about 18 carbon atoms); perborates; potassium salts; ammonium salts; lithium salts; inorganic acids (e.g., hydrochloric acid); and organic acids (e.g., formic acid and acetic acid). When an acid-type gel breaker is used, the gel breaker can optionally be separately injected downhole in aqueous solution form following the injection of the particulate/gelled carrier fluid blend.

When the gelling agent used in the inventive well treating composition is a substituted cellulose-type gelling agent, the gel breaker used will preferably be an enzyme-type gel breaker (e.g., cellulase) or an oxidant such as sodium persulfate. When the gelling agent used in the inventive composition is a substituted guar gelling agent, the gel breaker will preferably be a hemicellulase or an oxidant such as sodium persulfate.

The particulate material used in the inventive well treating composition can generally be any proppant or other water-insoluble particulate material of the type used in fracturing, gravel packing, frac-pack, and similar well treating operations. Examples include: sand; glass beads; nut shells; metallic pellets; gravel; synthetic resin pellets; gilsonite; coke; sintered alumina; mullite; and combinations thereof. The particulate material used in the present invention is most preferably sand. The particulate material will preferably have a particle size distribution in the range of from about 10 to about 70 mesh, U.S. sieve series.

The amount of particulate material used in the inventive well treating composition is preferably an amount in the range of from about 2 to about 20 pounds of particulate material per gallon of the gelled aqueous carrier liquid. Most preferably, the amount of particulate material used in the inventive well treating composition is an amount in the range of from about 3 to about 15 pounds of particulate material per gallon of gelled carrier liquid.

The epoxy resin system is present in the inventive well treating composition in an effective amount for consolidating the particulate material to form a hard permeable mass. Typically, the amount of epoxy resin system used in the inventive composition will be an amount providing in the range of from about 0.1 to about 20 pounds of epoxy resin per 100 pounds of particulate material.

One or more coupling agents can optionally be used in the inventive well treating composition to facilitate the coupling of the epoxy resin(s) with the particulate component of the inventive composition. Coupling agents preferred for use in the inventive composition are functional silanes. The coupling agent used in the inventive composition is most preferably N-beta-(aminoethyl)-gamma-aminopropyltrimethoxysilane. The amount of coupling agent used in the inventive composition will preferably be in an amount in the range of from about 0 to about 2 parts by weight per 100 parts by weight of epoxy resin used in the inventive composition.

As will be understood by those skilled in the art, hardening rate controllers (i.e., retarders or accelerators) can be used to extend or shorten the time necessary for curing the epoxy resin system. Examples of retarders suitable for use in the present invention include low molecular weight organic acid esters (e.g., alkyl esters of low molecular weight alkyl acids containing from about 2 to about 3 carbon atoms). Examples of accelerators suitable for use in the inventive resin system include: 2,4,6-trisdimethylaminomethylphenol; the ethylhexonate salt of 2,4,6-trisdimethylaminomethylphenol; and weak organic acids such as fumaric acid, erythorbic acid, ascorbic acid, and maleic acid. Any hardening rate controller used in the present invention will preferably be present in an amount in the range of from about 0 to about 10 parts by weight per 100 parts by weight of epoxy resin used in the composition.

The inventive well treating composition can further include one or more surfactants which enable the epoxy resin system to rapidly coat the particulate material. Examples of such surfactants and desirable concentrations thereof are disclosed, for example, in U.S. Pat. Nos. 4,199,484, 4,665,988, 5,128,390.

In order to further facilitate the coating of the particulate material, the inventive well treating composition can also include an aliphatic alcohol which is only slightly water-soluble. Examples of preferred aliphatic alcohols include isoamyl alcohol and isohexyl alcohol. When used, such alcohols are preferably present in the inventive composition in an amount in the range of from about 1 to about 2.5 gallons per 1000 gallons of gelled aqueous carrier liquid.

As will be understood by those skilled in the art and as exemplified in U.S. Pat. No. 5,128,390, the inventive composition can also include other components (e.g., oil-water demulsifiers, foaming agents, and the like) which are commonly used in fracturing, gravel packing, frac-pack, and other such operations.

The inventive well treating composition can be conveniently formed at the well site using generally any procedure which is commonly employed for preparing fracturing, frac-pack, and gravel packing compositions. The gelled aqueous carrier liquid is preferably prepared by first combining the gelling agent with brine or some other aqueous fluid to form a gelled aqueous carrier liquid. The resulting gelled aqueous carrier is then preferably conducted to a continuous stream mixing tub or other commonly used continuous mixing apparatus. In the mixing tub, the remaining components of the inventive composition are continuously added to and mixed with the gelled aqueous carrier liquid. As the components are mixed, the resulting mixture is continuously drawn from the mixing tub and injected into the well such that the inventive composition is placed or injected into a desired subterranean zone.

As the inventive composition flows down the well tubing toward the subterranean zone, the inventive composition is thoroughly blended such that: (a) the particulate material is suspended in the gelled aqueous carrier liquid; (b) the components of the epoxy resin system are thoroughly blended; and (c) the particulate material is thoroughly coated with the inventive epoxy resin system.

In one embodiment of the inventive method, the inventive well treating composition is used in a formation fracturing procedure. For example, the inventive well treating composition can be injected into a well under sufficient pressure to form fractures and/or enlarge existing fractures in a subterranean formation. The resin-coated particulate material deposits and consolidates in these fractures to provide fluid-permeable flow paths within the formation. Alternatively, the inventive well treating composition can be used in conducting fracturing operations of the type disclosed in U.S. Pat. Nos. 4,336,842 and 5,131,472. The entire disclosures of these patents are incorporated herein by reference.

In another embodiment of the present invention, the inventive well treating composition is used for gravel packing a well bore. In the inventive gravel packing method, a screening device is positioned in an open hole or inside a well casing. If placed in an open hole, the portion of the well bore which is to be packed will preferably be underreamed prior to placing the liner therein. After placing the liner in the well bore, the treating composition is preferably pumped down a tubing string positioned inside the screening device, out the distal end of the screening device, and into the annulus existing between the screening device and the bore wall or well casing. As a result, the resin-coated particulate material deposits in and is packed in the annulus. The treating composition carrier fluid separates from the particulate material, flows through the fluid openings in the screening device, and flows out of the well via the annulus existing between the treating composition tubing string and the interior wall of the liner.

After the resin-coated particulate material has been packed around the screening device, the resin system is allowed to harden. Upon hardening, the resin system consolidates the particulate material to form a hard, permeable mass around the screening device. Thus, the inventive gravel packing method provides a gravel pack which is highly permeable and which operates to prevent the migration of formation sand and fines into the screening device.

In an alternative embodiment of the inventive gravel packing method, the inventive well treating composition is used to pack an open or cased portion of a well bore. In this embodiment, a screening device is not used. Rather, the treating composition is preferably pumped into the well bore such that (a) the resin-coated particulate portion of the treating composition fills the portion of the well bore which is to be packed and (b) the carrier fluid portion of the treating composition separates from the particulate material and flows into the formation and/or out of the well via, e.g., a casing or tubing annulus. After the resin system hardens, a bore hole can optionally be drilled into the gravel pack in order to further facilitate fluid recovery.

In yet another embodiment of the present invention, the inventive well treating composition is used in the performance of a frac-pack procedure. The inventive frac-pack procedure preferably embodies the features of both the inventive fracturing and the inventive gravel packing procedures discussed hereinabove. In the inventive frac-pack procedure, a subterranean formation is preferably initially fractured by pumping the inventive well treating composition into the formation under sufficient pressure to fracture the formation. The resin-coated particulate component of the treating composition deposits in fractures which are opened and/or enlarged during the fracturing step. After a desired amount of fracturing is achieved, additional resin-coated particulate material is preferably packed in the well bore using a gravel packing procedure of the type described hereinabove. Most preferably, the additional particulate material is packed tightly around a gravel packing screen. Once the resin-coated particulate material is in place in the formation, the resin system is allowed to harden.

The following examples are presented in order to further illustrate the present invention.

EXAMPLE I

Fourteen epoxy novolac resin systems (i.e., resin systems 1–14) were prepared by mixing together, in the amounts indicated in Table I, EPI-REZ SU2.5 (a multifunctional epoxy novolac resin available from Rhone Poulenc), HELOXY 5044 (trimetholethane triglycidyl ether reactive diluent available from Pacific Anchor Chemical), butyl lactate, and A-1120 (N-beta-(aminoethyl)-gamma-aminopropyltrimethoxysilane available from Union Carbide) for 15 minutes using an overhead stirrer. Hardening agent compositions (i.e., either ANCAMINE DL-50 available from Pacific Anchor Chemical or a composition produced through the partial reduction of DL-50) were then added to the mixtures in the amounts stated in Table I. After adding the hardening agent compositions, each of the epoxy novolac resin systems was stirred thoroughly.

Epoxy resin systems 1–14 were then used, in the amounts stated in Table I, to coat 20/40 mesh Ottawa frac sand suspended in a gelled aqueous carrier liquid. The gelled aqueous carrier liquid used in each case contained 40 lb of hydroxypropyl guar per 1000 gallons of aqueous liquid and had a pH of 5. The aqueous liquid used for forming the carrier gel was a 2% aqueous KCL solution. Further, each sand/carrier gel suspension consisted of 500 g of sand per 555 mL of carrier gel.

Each resin-coated sand material was used to form a consolidated blend (i.e., consolidated blends 1–14) by packing the resin-coated sand material into a glass tube and then curing the epoxy resin system for 20 hours at 275° F. After curing, the compressive strength of each consolidated blend was determined at 72° F., 250° F., and/or 275° F. Additionally, the glass transition temperature and melt temperature of each of the cured resin systems was determined.

TABLE I

| EPOXY RESIN SYSTEMS PREPARED AND TESTED | | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| RESIN SYSTEM COMPONENTS[9] | | | | | | | | | | | | | | |
| SU 2.5[1] | 0.83 | 0.83 | 0.83 | 0.83 | 0.83 | 0.83 | 0.83 | 0.83 | 0.83 | 0.83 | 0.83 | 0.83 | 0.83 | 0.83 |
| HELOXY 5044[2] | 0.17 | 0.17 | 0.17 | 0.17 | 0.17 | 0.17 | 0.17 | 0.17 | 0.17 | 0.17 | 0.17 | 0.17 | 0.17 | 0.17 |
| ED-1[3] (mL/g of Hardener) | 0.045 | 0.045 | 0.045 | 0.045 | 0.045 | 0.045 | — | — | — | — | 0.045 | 0.045 | 0.045 | 0.045 |
| DL-50[4] | — | — | — | — | — | — | — | — | — | — | 1.0 | 1.0 | 1.0 | 1.0 |
| Partially Reduced[5] DL-50 | 1.0 | 1.0 | 1.0 | 1.0 | 1.0 | 1.0 | 1.0 | 1.0 | 1.0 | 1.0 | — | — | — | — |
| Methanol (mL/g of Hardener) | 0.68 | 0.38 | 0.38 | 0.38 | 0.38 | 0.38 | 0.38 | 0.38 | 0.38 | 0.19 | 0.82 | 0.82 | 0.82 | 0.82 |
| A-1120[6] (mL/g of Hardener) | 0.022 | 0.022 | 0.022 | 0.022 | 0.022 | 0.022 | 0.022 | 0.022 | 0.011 | 0.022 | 0.022 | 0.022 | 0.022 | 0.022 |
| CONSOLIDATED BLEND | | | | | | | | | | | | | | |
| Gallons of Resin System Used Per Sack of Sand | 3/8 | 3/8 | 3/8 | 3/8 | 1/2 | 3/8 | 3/8 | 3/8 | 3/8 | 3/8 | 3/8 | 3/8 | 3/8 | 1/4 |
| Compressive Strength (psi) At 72° F. | 1783 | 2145 | 2009 | 1774 | 3079 | 2411 | 2230 | 1657 | — | 1818 | 2817 | 2802 | 2199 | 1562 |
| At 250° F. | — | — | — | — | — | — | — | — | 1326 | — | — | — | — | — |
| At 275° F. | 745 | 1375 | 926 | 843 | 1281 | 1145 | 1292 | 1090 | — | 906 | 1803 | 2275 | 1857 | 882 |
| Tg (°F.)[7] | 311 | 315 | 302 | 302 | 302 | 302 | 302 | 302 | 320 | 302 | 302 | 320 | 293 | 293 |
| Tm (°F.)[8] | 342 | 351 | 345 | 345 | 345 | 385 | 381 | 381 | 370 | 345 | 343 | 342 | 327 | 327 |

Footnotes to Table I
[1]EPI-REZ SU2.5 multifunctional epoxy novolac resin available from Rhone-Poulenc.
[2]Trimethylolethane triglycidyl ether available from Pacific Anchor Chemical.
[3]Butyl lactate.
[4]ANCAMINE DL-50 hardening agent available from Pacific Anchor Chemical. ANCAMINE DL-50 is composed of approximately 63% by weight 4,4-methylene dianiline and approximately 37% by weight oligomers of formaldehyde and aniline including trimers (e.g., triamine 2,4-bis (para aminobenzyl) aniline) and quatermers of reaction.
[5]Hardening agent produced by partially reducing DL-50 by heating DL-50 along with hydrogen in the presence of a Pd on a carbon catalyst. This partially reduced aromatic amine hardening composition is now commercially available from Pacific Anchor Chemical under the tradename ANCAMINE 2264.
[6]N-beta-(aminoethyl)-gamma-aminopropyltrimethoxysilane available from Union Carbide.
[7]Glass transition temperature.
[8]Melt temperature.
[9]Unless otherwise included, all component concentrations are expressed in terms of gram equivalents. For an epoxy resin, the weight amount of the epoxy resin corresponding to one equivalent equals the molecular weight of the epoxy resin divided by the number of epoxide groups contained in the epoxy resin molecule. The gram equivalent weight of an amine hardening compound equals the molecular weight of the amine hardening compound divided by the number of reactive amine groups contained in the hardening compound molecule.

The glass transition temperature (Tg) of a cured epoxy resin generally indicates the upper useful temperature limit of the cured resin. As indicated in Table I, all of the hardened compositions prepared in this example using the partially reduced hardening agent composition had glass transition temperatures exceeding 300° F. Additionally, the glass transition temperatures provided by the partially reduced hardening composition were substantially identical to the glass transition temperatures provided by the non-reduced hardening agent composition.

As also indicated in Table I, the compressive strengths provided by the partially reduced hardening agent composition compare very favorably with the compressive strengths provided by the non-reduced composition.

EXAMPLE II

An inventive epoxy resin system having the same composition as resin systems 2–6 described in Table I was prepared and maintained at room temperature for 20 hours. The hardening agent used in this composition was the partially reduced hardening agent composition described in Example I. The inventive resin system gelled after 1 hour. After 20 hours, the inventive resin system exhibited a glass transition temperature of 275° F.

An otherwise identical epoxy resin system was prepared using ANCAMINE DL-50 as the hardening agent. This resin system was also maintained at room temperature for 20 hours. The second epoxy resin system gelled after 2 hours. After 20 hours, the resin system exhibited a glass transition temperature of 212° F.

As is thus apparent, the inventive epoxy resin system provided a significantly faster low temperature curing time than was provided by the resin system containing DL-50.

EXAMPLE III

An inventive resin system was prepared by stirring together 22.4 g EPI-REZ 510 (a multifunctional epoxy novolac resin available from Rhone-Poulenc) and 0.5 ml A1120 for 15 minutes followed by the addition of 6.6 g a partially reduced aromatic amine hardening agent in 5 ml methanol. The partially reduced hardening agent was the same as that used in Example I. The inventive resin system was used to coat 250 g of 20/40 Colorado Sand. 70 grams of the coated sand were loaded at 2.0 lb/ft$^2$ into an API linear conductivity cell on steel plates. The cell was placed in a conductivity press under 1000 psi closure stress and the temperature of the material was increased to 200° F. The cell was maintained at 1000 psi and 200° F. for 16 hours. The closure stress was then increased to 2000 psi. The 2000 psi closure stress was maintained for one hour and the fracture conductivity of the material was measured. This procedure was repeated for stress levels of 4000 and 6000 psi. The results are shown in Table I. A sample of the resin system cured under the same conditions (i.e., 200° F. for 16 hours) had a glass transition temperature of 266° F. As further indicated in Table II, the fracture conductivity of uncoated Colorado sand was also determined at closure stresses of 2000 psi, 4000 psi, and 6000 psi.

TABLE II

| Closure Stress | Fracture Conductivity (mD-ft) | |
| --- | --- | --- |
| (psi) | Uncoated | Coated |
| 2000 | 2160 | 2852 |
| 4000 | 489 | 910 |
| 6000 | 147 | 239 |

Table II indicates that the fracture conductivity of Colorado sand consolidated with the inventive resin composition was substantially higher, at all closure stresses tested, than the fracture conductivity of uncoated Colorado sand. Thus, the coating and consolidation of the sand material using the inventive resin composition substantially improves the material's stress resistance.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A well treating composition comprising:
    an epoxy resin;
    a partially reduced aromatic amine hardening agent;
    wherein said aromatic amine hardening agent is a compound having at least one nonreduced inner aromatic structure and at least two outer cycloaliphatic ring structures; and
    a carrier fluid.

2. The well treating composition of claim 1 wherein said aromatic amine hardening agent is a compound selected from the group consisting of:

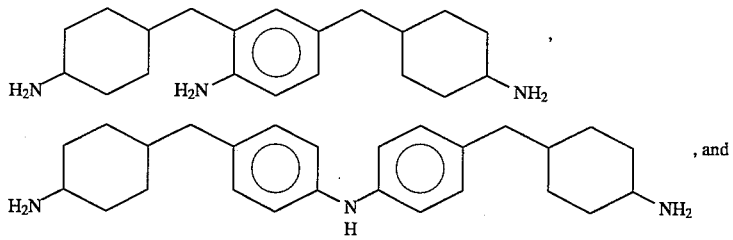

combinations thereof.

3. The well treating composition of claim 1 wherein said epoxy resin is an epoxy novolac resin.

4. The well treating composition of claim 1 wherein said carrier fluid is a gelled aqueous carrier fluid.

5. The well treating composition of claim 1 further comprising a particulate material.

6. The well treating composition of claim 5 wherein said particulate material is sand.

7. A well treating composition comprising:
    an epoxy resin;
    a multifunctional partially reduced aromatic amine hardening agent;
    wherein said aromatic amine hardening agent is a compound selected from the group consisting of:

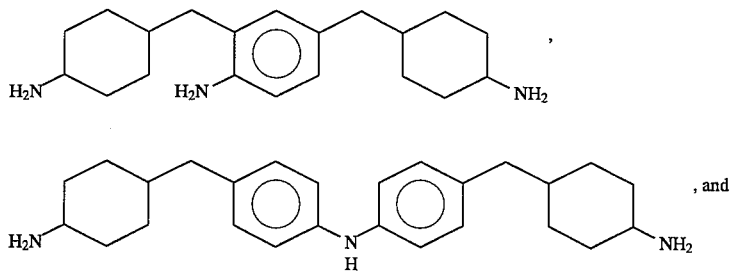

combinations thereof;
    a solid particulate material; and
    a carrier fluid.

8. The well treating composition of claim 7 wherein said epoxy resin is an epoxy novolac resin.

9. The well treating composition of claim 7 wherein said carrier fluid is a gelled aqueous carrier fluid.

10. The well treating composition of claim 7 wherein said particulate material is sand.

* * * * *